US010548367B2

United States Patent
Kenens et al.

(10) Patent No.: US 10,548,367 B2
(45) Date of Patent: Feb. 4, 2020

(54) FOOTWEAR SOLE COMPRISING A PROPYLENE-BASED ELASTOMER, FOOTWEAR COMPRISING SAID SOLE, AND METHODS OF MAKING THEM

(71) Applicants: Leander Kenens, Kessel-Lo (BE); Randal H. Kerstetter, III, Wadsworth, OH (US)

(72) Inventors: Leander Kenens, Kessel-Lo (BE); Randal H. Kerstetter, III, Wadsworth, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 454 days.

(21) Appl. No.: 13/752,986

(22) Filed: Jan. 29, 2013

(65) Prior Publication Data
US 2014/0208619 A1 Jul. 31, 2014

(51) Int. Cl.
| | |
|---|---|
| *C08L 33/04* | (2006.01) |
| *A43B 13/02* | (2006.01) |
| *C08J 5/00* | (2006.01) |
| *A43B 13/04* | (2006.01) |
| *C08J 3/00* | (2006.01) |
| *A43B 1/00* | (2006.01) |
| *C08F 220/18* | (2006.01) |
| *C09J 133/08* | (2006.01) |

(52) U.S. Cl.
CPC ............ *A43B 13/02* (2013.01); *A43B 1/0063* (2013.01); *A43B 13/04* (2013.01); *C08J 3/00* (2013.01); *C08J 5/00* (2013.01); *C08F 220/18* (2013.01); *C08F 2438/01* (2013.01); *C08L 33/04* (2013.01); *C09J 133/08* (2013.01)

(58) Field of Classification Search
CPC ....... A43B 1/0063; A43B 13/02; A43B 13/04; C08J 5/00; C08J 3/00; C08L 33/04; C08F 2438/01; C08F 220/18; C09J 133/08
See application file for complete search history.

(56) References Cited

U.S. PATENT DOCUMENTS

| | | | | |
|---|---|---|---|---|
| 3,637,617 | A | * | 1/1972 | Wirth et al. ............... C08J 7/08 525/331.7 |
| 7,421,805 | B2 | | 9/2008 | Geer |
| 8,240,067 | B2 | | 8/2012 | Sussman |
| 8,245,417 | B2 | | 8/2012 | Polegato Moretti |
| 8,296,974 | B2 | | 10/2012 | Sonnenschein et al. |
| 2005/0131142 | A1 | | 6/2005 | Datta et al. |
| 2006/0199872 | A1 | * | 9/2006 | Prieto et al. ............... C08J 9/00 521/142 |
| 2009/0247656 | A1 | | 10/2009 | Jacob et al. |
| 2010/0064547 | A1 | | 3/2010 | Kaplan et al. |
| 2011/0078922 | A1 | | 4/2011 | Cavaliere et al. |
| 2017/0181498 | A1 | * | 6/2017 | Whelan et al. ........ A43B 13/04 |

OTHER PUBLICATIONS http://www.iisrp.com/webpolymers/10epdmsep11.pdf, from the World Wide Web on Nov. 10, 2015. Cited as evidence, only.*
http://www.otsfootweartester.com/portfolio-item/ots-d19-satra-tm64-compression-rebound-tester/Taken from the web, as evidence, Mar. 7, 2016.*
https://www.shinetsusilicone-global.com/catalog/pdf/rubber_e.pdf Taken from the World Wide Web Trade Sheet from Shin-Etsu, "Characteristic properties of Silicone Rubber Compounds," pp. 1-16, 2005.*

* cited by examiner

Primary Examiner — Nathan M Nutter

(57) ABSTRACT

Disclosed are footwear soles comprising a propylene-based elastomer. The presence of the propylene-based elastomer provides the footwear sole with a well-balanced combination of desired properties, including low density, low compression set, and weldability.

16 Claims, No Drawings

FOOTWEAR SOLE COMPRISING A PROPYLENE-BASED ELASTOMER, FOOTWEAR COMPRISING SAID SOLE, AND METHODS OF MAKING THEM

FIELD OF THE INVENTION

This invention relates to footwear soles. More particularly, this invention relates to footwear soles comprising a propylene-based elastomer, footwear comprising said sole, and methods of making them.

BACKGROUND OF THE INVENTION

Conventional articles of footwear include two primary elements—a laminated sole attached to a soft and pliable upper. The laminated sole structure generally incorporates multiple layers that are conventionally referred to as an insole, a midsole, and an outsole. The insole is a thin, cushioning member located within the upper and adjacent to the plantar (lower) surface of the foot to enhance footwear comfort. The midsole, which is traditionally attached to the upper along the entire length of the upper, forms the middle layer of the sole is structure and serves a variety of purposes which include controlling foot motion and providing cushioning. The outsole forms the ground-contacting element of footwear and is usually fashioned from a durable, wear-resistant material that includes texturing to improve traction.

The primary element of a conventional midsole is a resilient, polymer foam material, such as polyurethane, ethyl vinyl acetate (EVA), a plastomer, or a rubber compound that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness, degree of ground reaction force attenuation, and energy absorption properties may be altered to meet the specific demands of the activity for which the footwear is intended to be used.

Various materials, including leather, rubber, and textile, may be utilized in manufacturing the upper structure. Different layers of the upper may be formed from numerous material elements that each imparts different properties to specific areas of the upper.

Once separately finished, the upper and the sole can be sewn together, glued together, and/or welded together.

U.S. Pat. No. 8,240,067 relates to a shoe, especially to a sport shoe, with a shoe upper and a sole consisting of at least two parts. To obtain a shoe having high flexibility and a low weight, the shoe upper as well as the parts of the sole consist of a material with a low bending stiffness. The shoe upper consists preferably of leather, artificial leather, and/or textile material, while the sole parts can consist of rubber, polyurethane, polyamide, ethyl vinyl acetate (EVA), or a mixture of these materials. To provide the shoe with the necessary stiffness for a usual use, a sole element with a high bending stiffness, which is adapted to the shape of the foot, can be arranged in the interior of the shoe above the parts of the sole. The sole element can consist of a forefoot part and a rearfoot part, wherein the two parts are connected by a hinge or an articulation. The hinge can be designed as a plastic joint which is directly injection molded to both parts. Furthermore, the hinge can consist of polyurethane, polyamide, polyethylene, polypropylene, or a mixture of these materials. The sole element can be provided with reinforcing fibers, wherein primary glass fibers or carbon fibers are suggested.

U.S. Pat. No. 8,245,417 discloses a vapor-permeable and waterproof sole for shoes, including a tread including a plurality of through holes, a multilayer pack, arranged superimposed on the region where the through holes are provided and including a membrane, permeable to water vapor and impermeable to liquids, and a protective layer, arranged directly below the membrane. The pack includes a vapor-permeable or perforated layer element, which is constituted by one of the following materials: nonwoven fabric or pile fabric or needle felt, leather, or microporous EVA.

U.S. Pat. No. 8,296,974 relates to a thermoplastic polyurethane (TPU) molded shoe sole comprising: (a) from about 30 to about 55 weight percent based on total TPU of hard segment comprising structural units of (i) diisocyanate and (ii) chain extender; (b) from 45 to about 70 weight percent based on total TPU of soft segment comprising structural units of: (i) polycaprolactone diol and (ii) poly (oxypropylene)-poly(oxyethylene)glycol polyether diol. This TPU is said to have good combinations of light transmission and clarity, tensile strength, low temperature flexibility, and high moisture vapor transition rates compared to other commercial or known TPUs.

One problem associated with traditional materials for manufacturing footwear soles, such as polyurethane or EVA, is that they cannot deliver a targeted combination of desired properties with a single composition. In addition, in order to adapt to specific requirements on performance of the upper structure, different materials are applied to the upper than those to the sole. Therefore, there remains a need for a material for manufacturing footwear soles which can provide a balance between a set of desired properties including relatively low density, low compression set, weldability, slip resistance, and abrasion durability comparable to those of rubber, etc., preferably to be used for the entire article of footwear so that subsequent unified recycling is possible. Applicants have found that the above can be achieved by manufacturing footwear soles, preferably the entire article of footwear, using a composition comprising a propylene-based elastomer, preferably in combination with an ethylene-based copolymer. Furthermore, the addition of the propylene-based elastomer can improve the weldability, while maintaining instead of compromising other properties at their desired levels, and can reduce or eliminate the use of an adhesive for the bonding process of the upper and the sole by using welding only.

SUMMARY OF THE INVENTION

A footwear may comprise a footwear sole and a footwear upper as described herein. The footwear sole may comprise a composition comprising: a propylene-based elastomer comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g. Preferably, the composition further comprises an ethylene copolymer. In a preferred embodiment, the footwear sole has at least one of the following properties: (a) a density (SATRA TM134) of less than about 0.40 g/cm3; and (b) a compression set (SATRA TM64, 50° C.) of less than about 25%.

Preferably, the footwear upper comprises a second composition comprising a propylene-based elastomer containing at least about 50 wt % propylene-derived units and about 5 to about 35 wt % ethylene-derived units, based on total weight of the propylene-based elastomer, wherein the propylene-based elastomer has a heat of fusion of less than about 80 J/g.

A method for manufacturing a footwear sole may comprise the step of: preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g.

Also described herein are methods for manufacturing footwear, comprising the steps of: (a) preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g; and (b) forming a footwear comprising the footwear sole in step (a).

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc.

As used herein, when a polymer is referred to as comprising a monomer, the monomer is present in the polymer in the polymerized form of the monomer or in the is derivative form of the monomer.

As used herein, when a polymer composition or blend is said to comprise a certain percentage, wt %, of a monomer, that percentage of monomer is based on the total amount of monomer units in all the polymer components of the composition or blend.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

As used herein, unless specified otherwise, the term "copolymer(s)" refers to polymers formed by the polymerization of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, a "plastomer" shall mean ethylene based copolymers having a density in the range of about 0.85 to 0.915 g/cm$^3$ ASTM D 4703 Method B and ASTM D 1505. Often, it will be desirable to use the lowest density plastomer consistent with maintaining good handling of the plastomer resin. Plastomers useful in the compositions described herein typically exhibit a MFR of from about 0.5 to about 30 g/10 min. Plastomers useful in the compositions described herein include copolymers of ethylene derived units and higher α-olefin derived units such as propylene, 1-butene, 1-hexene, and 1-octene.

As used herein, "phr" is parts per hundred rubber or "parts", and is a measure common in the art wherein components of a composition are measured relative to a major elastomer component(s), based upon 100 parts by weight of the elastomer(s) or rubber(s).

As used herein, the bonding process conducted "without" use of an adhesive refers to the bonding process substantially devoid of use of an adhesive, which means the adhesive is not added deliberately during the bonding process and, if present, is present in an amount of less than about 1 g per each upper and sole being bonded together.

The present invention relates to a footwear sole comprising a propylene-based elastomer, footwear comprising said sole, and methods of making the footwear. The footwear sole comprises a composition comprising: a propylene-based elastomer comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g. Preferably, the composition further comprises an ethylene copolymer. In preferred embodiments, the footwear sole has at is least one of the following properties: (a) a density (SATRA TM134) of less than about 0.40 g/cm3; and (b) a compression set (SATRA TM64, 50° C.) of less than about 25%.

Propylene-Based Elastomer

The propylene-based elastomer is a copolymer of propylene-derived units and units derived from at least one of ethylene or a $C_4$-$C_{10}$ alpha-olefin. The copolymer may contain at least about 50 wt % propylene-derived units of the propylene-based elastomer. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The units, or comonomers, derived from at least one of ethylene or a $C_4$-$C_{10}$ alpha-olefin may be present in an amount of about 1 to about 35 wt %, or about 5 to about 35 wt %, or about 7 to about 32 wt %, or about 8 to about 25 wt %, or about 8 to about 20 wt %, or about 8 to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min.

In preferred embodiments, the comonomer is ethylene, 1-hexene, or 1-octene. In some embodiments, the propylene-based elastomer comprises ethylene-derived units. The propylene-based elastomer may comprise about 5 to about 35 wt %, or about 7 to about 32 wt %, or about 8 to about 25 wt %, or about 8 to about 20 wt %, or about 8 to about 16 wt %, ethylene-derived units of the propylene-based elastomer. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than is one comonomer. Preferred embodiments of a propylene-based elastomer having more than one comonomer include propylene-ethylene-octene, propylene-ethylene-hexene, and propylene-ethylene-butene polymers. In some embodiments where more than one comonomer derived from at least one of ethylene or a $C_4$-$C_{10}$ alpha-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}C$ NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from about 1.0, 1.5, 3.0, 4.0, 6.0, or 7.0 J/g, to about 30, 35, 40, 50, 60, 70, 75, or 80 J/g.

The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22% of isotactic polypropylene. Embodiments of the propylene-based elastomer may have a tacticity index m/r from a lower limit of about 4 or about 6 to an upper limit of about 8 or about 10 or about 12. In some embodiments, the propylene-based elastomer has an isotacticity index greater than 0%, or within the range having an upper limit of about 50% or about 25%, and a lower limit of about 3% or about 10%.

In some embodiments, crystallinity of the propylene-based elastomer is reduced by copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of about 95 wt %, about 94 wt %, about 92 wt %, about 90 wt %, or about 85 wt %, to a lower is limit of about 60 wt %, about 65 wt %, about 70 wt %, about 75 wt %, about 80 wt %, about 84 wt %, or about 85 wt % of the propylene-based elastomer.

The propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of optional diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, or about 1%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25 to about 105° C., or about 60 to about 105° C., or about 70 to about 105° C., or about 90 to about 105° C.

The propylene-based elastomer may have a density of about 0.850 to about 0.920 g/cm$^3$, or about 0.860 to about 0.900 g/cm$^3$, or about 0.870 to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In one embodiment, the propylene-based elastomer has an MFR about 2 to about 20 g/10 min, about 3 to about 10 g/10 min, or about 5 to about 10 g/10 min.

The propylene-based elastomer may have an Elongation at Break of less than about 2000%, less than about 1800%, less than about 1500%, less than about 1000%, or less than about 800%, as measured per ASTM D412.

The propylene-based elastomer may have a weight average molecular weight ($M_w$) of about 5,000 to about 5,000,000 g/mole, or about 10,000 to about 1,000,000 g/mole, or about 50,000 to about 400,000 g/mole; a number average molecular weight ($M_n$) of about 2,500 to about 250,000 g/mole, or about 10,000 to about 250,000 g/mole, or about 25,000 to about 200,000 g/mole; and/or a z-average molecular weight ($M_z$) of about 10,000 to about 7,000,000 g/mole, or about 80,000 to about 700,000 g/mole, or about 100,000 to about 500,000 g/mole. The propylene-based elastomer may have a molecular weight distribution ("MWD") of about 1.5 to about 20, or about 1.5 to about 15, preferably about 1.5 to about 5, and more preferably about 1.8 to about 3, and most preferably about 1.8 to about 2.5.

The composition of the invention may include one or more different propylene-based elastomers, i.e., propylene-based elastomers each having one or more different properties such as, for example, different comonomer or comonomer content. Such combinations of various propylene-based elastomers are all within the scope of the invention.

In certain embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based elastomer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The propylene-based elastomer can be present in an amount of about 2 to about 98 wt %, preferably about 2 to about 60 wt %, particularly from a lower limit of about 2, about 7, about 12, about 17, about 22, about 27 wt %, to an upper limit of about 32, about 37, about 42, about 47, about 52, about 57, about 60 wt % of the composition of the present invention, or in the range of any of the combinations of the values recited herein.

The propylene-based elastomer may comprise copolymers prepared according to the procedures described in WO 02/36651, U.S. Pat. No. 6,992,158, and/or WO 00/01745. Preferred methods for producing the propylene-based elastomer may be found in U.S. Pat. Nos. 7,232,871 and 6,881,800. The invention is not limited by any particular polymerization method for preparing the propylene-based elastomer, and the polymerization processes are not limited by any particular type of reaction vessel.

Preferred propylene-based elastomers are available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

Ethylene Copolymer

Preferred ethylene copolymers useful in the compositions described herein include those having an:
1) ethylene content of 50 to 90 wt % (preferably 60 to 85 wt %, or 65 to 80 wt %, or 65 to 75 wt %); and/or
2) ethylene content of 80 to 96 mol % (preferably 82 to 92 mol %, or 82 to 88 mol %, or 84 to 86 mol %); and/or
3) propylene content of 10 to 20 wt %; and/or
4) butene-1 content of 15 wt % or more (preferably 20 wt % or more, or 25 wt % or more); and/or
5) hexene-1 content of 20 wt % or more (preferably 25 wt % or more, or 30 wt % or more); and/or
6) octene-1 content of 25 wt % or more (preferably 30 wt % or more, or 35 wt % or more).

Useful ethylene copolymers may have one or more of the following properties:
1) density of 0.91 g/cm³ or less (preferably 0.905 g/cm³ or less, or 0.902 g/cm³ or less, or 0.85 g/cm³ or more, or 0.86 g/cm³ or more, or 0.87 g/cm³ or more, or 0.88 g/cm³ or more, is or 0.885 g/cm³ or more, or 0.85 to 0.91 g/cm³, or 0.86 to 0.91 g/cm³, or 0.87 to 0.91 g/cm³, or 0.88 to 0.905 g/cm³, or 0.88 to 0.902 g/cm³, or 0.885 to 0.902 g/cm³); and/or
2) heat of fusion ($H_f$) of 90 J/g or less (preferably 70 J/g or less, or 50 J/g or less, or 30 J/g or less, or 10 to 70 J/g, or 10 to 50 J/g, or 10 to 30 J/g); and/or
3) crystallinity of 40% or less (preferably 30% or less, or 20% or less, preferably at least 5%, or in the range of from 5 to 30%, or from 5 to 20%); and/or
4) melting point ($T_m$, peak first melt) of 100° C. or less (preferably 95° C. or less, or 90° C. or less, or 80° C. or less, or 70° C. or less, or 60° C. or less, or 50° C. or less); and/or
5) crystallization temperature ($T_c$, peak) of 90° C. or less (preferably 80° C. or less, or 70° C. or less, or 60° C. or less, or 50° C. or less, or 40° C. or less); and/or
6) glass transition temperature ($T_g$) of −20° C. or less (preferably −30° C. or less, or −40° C. or less); and/or
7) $M_w$ of 30 to 2,000 kg/mol (preferably 50 to 1,000 kg/mol, or 90 to 500 kg/mol); and/or
8) $M_w/M_n$ of 1 to 40 (preferably 1.4 to 20, or 1.6 to 10, or 1.8 to 3.5, or 1.8 to 2.5); and/or
9) branching index (g') 1.4 to 20 (preferably 1.6 to 10, or 1.8 to 10); and/or
10) melt index (MI, 2.16 kg at 190° C.) of 0.1 to 100 g/10 min (preferably 0.3 to 60 g/10 min, or 0.5 to 40 g/10 min, or 0.7 to 20 g/10 min); and/or
11) CDBI of at least 60 wt % (preferably at least 70 wt %, or at least 80 wt %, or at least 90 wt %, or at least 95 wt %).

In preferred embodiments, the ethylene copolymer is an ethylene-based plastomer with a density of 0.86 to 0.91 g/cm³ (preferably 0.87 to 0.91 g/cm³, or 0.88 to 0.91 g/cm³, or 0.88 to 0.905 g/cm³, or 0.885 to 0.902 g/cm³). Preferred plastomers comprise about 50 to about 85 wt % (preferably about 50 to about 75 wt %) ethylene-derived units and up to 50 wt % (preferably 20 to 40 wt %) of units derived from one or more olefins selected from propylene and $C_4$-$C_{20}$ olefins (preferably 1-butene, 1-hexene, and/or 1-octene).

In another preferred embodiment, the ethylene copolymer is an ethylene elastomer with a density of less than 0.86 g/cm³, comprised of ethylene-derived units and at least 30 wt % of units derived from one or more $C_4$-$C_{20}$ olefins (preferably 1-butene, 1-hexene, and/or 1-octene).

In any embodiment, the ethylene copolymer can be a random copolymer, a block copolymer, and blends thereof.

The method of making the ethylene copolymer is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems, or combinations thereof.

Useful ethylene copolymers may be produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings by may substituted or unsubstituted. For more information on the methods and catalysts/activators to produce such mPE homopolymers and copolymers see WO 94/26816; WO 94/03506; EPA 277,003; EPA 277, 004; U.S. Pat. Nos. 5,153,157; 5,198,401; 5,240,894; 5,017, 714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506; and U.S. Pat. No. 5,055,438. More generally, preferred plastomers are produced using a single-site catalyst, whether a metallocene catalyst or not, and have a $M_w/M_n$ of 1.5 to 3 (preferably 1.8 to 2.5) and a CDBI of 70% or more (preferably 80% or more, or 90% or more).

Plastomers that are useful in this invention include those commercially available under the trade names EXACT™ (ExxonMobil Chemical Company, Houston, Tex., USA), AFFINITYT™, ENGAGE™, FLEXOMER™ (The Dow Chemical Company, Midland, Mich., USA), and TAF-MER™ (Mitsui Company, Japan).

Filler

The composition used for the footwear sole may include at least one filler. The classes of materials described herein that are useful as fillers can be utilized alone or admixed to obtain desired properties. In any of the embodiments, the filler may be present at less than about 10 phr relative to the total of the propylene-based elastomer and the ethylene copolymer (if present).

Desirable fillers can be organic fillers and/or inorganic fillers. Organic fillers include such materials as carbon black, fly ash, graphite, cellulose, starch, flour, wood flour, and polymeric fibers like polyester-based, polyamide-based materials, etc.

Preferred examples of inorganic fillers are calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, is calcium silicate, titanium dioxide, titanates, clay, nanoclay, organo-modified clay or nanoclay, glass microspheres and chalk. Of these fillers, calcium carbonate, barium sulfate, antimony oxide, talc, silica/glass, glass fibers, alumina, aluminum trihydroxide, magnesium hydroxide and titanium dioxide, and mixtures thereof are preferred.

Foaming Agent

The compositions used for the footwear sole of the present invention may be foamed by the addition of at least one physical or chemical foaming agent or by blending with polymeric, ceramic, metal, and glass microspheres. The use of a foamed polymer allows the footwear designer to adjust the density or mass distribution of the footwear sole to control foot motion and provide cushioning, and thus, to acquire appropriate performance of the footwear sole. Foamed materials also offer a potential cost savings due to the reduced use of polymeric material.

Useful foaming agents include but are not limited to organic foaming agents, such as azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. A gas, such as air, nitrogen, carbon dioxide, etc., may also be injected into the composition during the injection molding process. Specifically, the foaming agent can be azodicarbonamide (ADC), which is chemically designated as $H_2NC(=O)N=NC(=O)NH_2$.

The foaming agent can be employed in an amount of about 1 phr to about 10 phr, or about 2 phr to about 8 phr, or about 3 phr to about 6 phr, relative to the total of the polymer to be foamed, i.e., the propylene-based elastomer and the ethylene copolymer (if present).

Useful foaming agents can include those commercially available under the trade names GENITRON™, POROFOR™, FICEL™ (Lanxess AG, Germany), SUVA™ DYMEL™, FORMACEL™, ZYRON™ (DuPont Chemical Company, Wilmington, Del., USA), PLANAGEN™ (INBRA S.A., Brazil), and EXXSOL™ (ExxonMobil Chemical Company, Houston, Tex., USA).

Curing Agent and Coagent

In some embodiments, the ethylene copolymer component is cured using a curing agent and/or coagent. In some embodiments, the propylene-based elastomer contains an is unsaturation structure and may also be cured.

Cross-linking and curing agents include sulfur, zinc oxide, and fatty acids. Peroxide cure systems can also be used. Generally, polymer compositions can be crosslinked by adding curative molecules, for example sulfur, metal oxides (i.e., zinc oxide), organometallic compounds, radical initiators, etc., followed by heating. In particular, the following are common curatives that may be useful in the present invention: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. Crosslinked polymers that are suitable for use in this invention are preferably cured by an organic peroxide and a coagent.

Organic peroxides suitable for use in the compositions described herein include, but are not limited to 1,1-bis(t-butylperoxy)-3,5,5-trimethylcyclohexane; 1,1-bis(t-butylperoxy)cyclohexane; 2,2-bis(t-butylperoxy)octane; n-butyl-4, 4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha,alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, and alpha,alpha'-bis(t-butylperoxy-m-isopropyl) benzene.

The amount of peroxide compounded is generally in the range of 0.05-5 phr, preferably in the range of about 0.1 to about 3 phr, relative to the weight of the polymer to be cured. This range is selected because if the peroxide is present in an amount too low, e.g., of less than 0.05 phr, the vulcanization rate may be insufficient which can lead to poor mold release. On the other hand, if the peroxide is present in an amount too high, e.g., of greater than 5 phr, the compression set of the cured polymer can become unacceptably high. The organic peroxides may be used singly or in combinations of two or more types.

Coagents employed in the curable part of the composition used for the footwear sole can include multifunctional unsaturated compounds such as trimethylolpropane trimethacrylate (TMPTMA), triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, bis-olefins and N,N-diallylacrylamide.

The amount of coagent compounded is generally in the range of about 0.1 to about 10 phr relative to the weight of the polymer to be cured. This concentration range is selected because if the coagent is present in amounts too low, e.g., less than 0.1 phr, the crosslink density of the cured polymer may be unacceptable. On the other hand, if the coagent is present in amounts too high, e.g., above 10 phr, it can bloom to the surface during molding, resulting in poor mold release characteristics. The preferable range of coagent is about 0.2 to about 6 phr relative to the polymer to be cured. The coagent may be used singly or as a combination of two or more types.

Methods for Manufacturing a Footwear Sole and Footwear

The process for preparing the composition used for manufacturing the footwear soles described herein may comprise first step feeding components, comprising a propylene-based elastomer and optionally an ethylene copolymer, forming the composition thereof optionally together with a coagent at a temperature at which no crosslinking occurs or only partially occurs. At the end of the process, the material is melt processable like a thermoplastic material.

The process may also comprise conversion of a curable thermoplastic phase by processing, preferably by injection molding, the composition comprising the curable thermoplastic phase at the crosslinking temperature of the curing agent. In this embodiment melt processing and crosslinking are achieved in a single step.

In one aspect, a masterbatch of a chemical initiator can be prepared and blended with the unsaturation-containing composition prior to or during melt processing. The masterbatch method may comprise the steps of: (a) feeding a curable composition; (b) feeding a cross-linking initiator; (c) processing said compositions to form a curable melt-processable polymer; and (d) cross-linking said curable melt-processable polymer; wherein step (d) may occur after step (c) or partially during step (c).

The mixing of the components with the coagent may be carried out using any suitable mixing device, e.g., known as single, twin screw, Buss co-kneader, and BANBURY™ mixer, followed by a batch or continuous polymerization process carried out at a temperature at which no or only partial cross-linking occurs. Mixing of the unsaturation-containing composition with the curing agent is carried out by methods such as absorption or solids blending followed by a temperature controlled thermoplastic process capable to control temperature and shear viscosity to prevent premature activation of the curing agent. In general, the temperature is kept below the activation temperature for crosslinking.

In another aspect, the conversion of a curable thermoplastic phase to a low-density thermoset phase can be carried out by processing the composition comprising the curable thermoplastic phase at a temperature above the decomposition temperature of a foaming agent and at the crosslinking temperature of the curing agent.

An activator for the foaming agent is typically present as well. Suitable activators are zinc oxide, zinc stearate, and zinc. The activator is usually added in an amount of between about 0.5 and about 5 phr relative to the total of the polymer to be foamed. Foaming preferably takes place before crosslinking.

The composition used for manufacturing the footwear soles described herein can be processed via a variety of molding techniques, such as injection molding, compression molding, casting, etc. Preferably, footwear soles are produced via injection molding. Non-limiting exemplary injection molding conditions may include temperatures, pressures, and cycle times as indicated in Table 1.

TABLE 1

| Injection Molding Conditions for Footwear Soles | | | |
|---|---|---|---|
| | Temperature (° C.) | Injection Pressure (mPa) | Cycle Times (sec) |
| Melt | 160-260 | Packing 25-180 | Filling and Packing 40-90 |
| Mold Front/Back | 10-30 | Hold 5-25 | Hold 15-30 Cooling Time 50-100 Screw Retraction 5-50 |

A method for manufacturing a footwear sole may comprise the step of: preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g.

A method for manufacturing footwear may comprise the steps of: (a) preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g; and (b) forming a footwear comprising the footwear sole in step (a). Preferably, the method further comprises the steps of: preparing a footwear upper; and attaching the footwear upper to the footwear sole.

In at least one preferred embodiment, the footwear upper is prepared by using a composition comprising a propylene-based elastomer containing at least about 50 wt % propylene-derived units and about 5 to about 35 wt % ethylene-derived units, based on total weight of the propylene-based elastomer, wherein the propylene-based elastomer has a heat of fusion of less than about 80 J/g. The composition used for the footwear upper may be the same or different than the composition used for the footwear sole. When the compositions are different, this means that at least one property of the polymer being used is different or that a different polymer is sued. Preferably, the propylene-based elastomer used for the footwear upper is the same one present in the footwear sole. More preferably, the corresponding compositions based on the propylene-based elastomer in both the footwear upper and the footwear sole are identical.

The footwear sole may be attached to the footwear upper by any of various methods, such as, adhesive, heat bonding, welding or mechanical connection to form a complete article of footwear. Preferably, the footwear sole and the footwear upper are attached by welding. More preferably, the footwear sole and the footwear upper are attached without use of an adhesive. Addition of the propylene-based elastomer described herein, especially when used with specific amounts of, e.g., about 50 phr to about 100 phr relative to the total of the propylene-based elastomer and the ethylene copolymer (if present), into the composition for manufacturing footwear soles can maintain post-crosslinking weldability at a level sufficient to achieve the possibility of eliminating use of an adhesive when bonding the footwear sole and the footwear upper by using the welding method only, which renders the footwear manufacturing process more efficient and more environmentally friendly.

Rather than obtaining one targeted property at the expense of another as in the manufacturing process using traditional materials for footwear, the footwear manufacturing method of the present invention can be conducted by the welding method during the bonding process of the upper and the sole while ensuring footwear soles maintain other targeted properties at desired levels. Thus, it is possible to produce footwear soles, preferably articles of footwear, made from a composition comprising the propylene-based elastomer described is herein having (a) densities (SATRA TM134) ranging from an upper limit of about 0.40 g/cm$^3$, about 0.35 g/cm$^3$, or about 0.30 g/cm$^3$, to a lower limit of about 0.25 g/cm$^3$, about 0.20 g/cm$^3$, or about 0.15 g/cm$^3$; and (b) compression sets (SATRA TM64, 50° C.) from an upper limit of about 25%, about 20%, or about 15%, to a lower limit of about 12%, about 10%, or about 8%.

The compositions described herein provide a footwear sole with a well-balanced combination of desired properties, such as a relatively low density comparable to or even lower than that of currently used EVA or polyurethane, a compression set lower than the common level of about 25% to about 30%, and the ability to retain sufficient weldability after crosslinking to eliminate or reduce the need for adhesives during the subsequent bonding process, all of which would both increase production efficiency and impart targeted performance to the final product of footwear.

The footwear sole may comprise the propylene-based elastomer described herein in an amount of about 50 phr to about 100 phr, or about 55 phr to about 95 phr, or about 60 phr to about 90 phr, or about 65 phr to about 85 phr, or about 70 phr to about 80 phr, for example, about 50 phr, about 55 phr, about 60 phr, about 65 phr, about 70 phr, about 75 phr, about 80 phr, about 85 phr, about 90 phr, about 95 phr, or about 100 phr, relative to the total of the propylene-based elastomer and the ethylene copolymer (if present). The footwear sole may have at least one of the following properties: (a) a density (SATRA TM134) of less than about 0.40 g/cm$^3$, or less than about 0.35 g/cm$^3$, or less than about 0.30 g/cm$^3$, or less than about 0.25 g/cm$^3$, or less than about 0.20 g/cm$^3$, or less than about 0.15 g/cm$^3$; and (b) a compression set (SATRA TM64, 50° C.) of less than about 25%, or less than about 20%, or less than about 15%, or less than about 12%, or less than about 10%, or less than about 8%.

In addition, other properties of the footwear described herein may include slip resistance and abrasion durability comparable to those of rubber, and processability capability of taking very defined molding details.

To achieve targeted properties at certain specific levels, commonly used compositions for manufacturing footwear soles based on EVA plus a plastomer may need to have the polymer phase fully crosslinked, which would result in loss of weldability in the subsequent bonding process of the sole with the upper. In contrast, the propylene-based elastomer described herein, particularly when used with an amount of about 50 phr to about 100 phr relative to the total of the propylene-based elastomer and the ethylene copolymer, can ensure weldability by maintaining sufficient thermoplastic phase in the polymer composition after the crosslinking reaction.

The present invention also relates to a footwear comprising a footwear upper and is the footwear sole described herein. Preferably, the footwear upper comprises a composition comprising a propylene-based elastomer containing at least about 50 wt % propylene-derived units and about 5 to about 35 wt % ethylene-derived units, based on total weight of the propylene-based elastomer, wherein the propylene-based elastomer has a heat of fusion of less than about 80 J/g. In preferred embodiments, the footwear upper is made from the same propylene-based elastomer present in the footwear sole. More preferably, the corresponding compositions based on the propylene-based elastomer in both the footwear upper and the footwear sole are identical. In the case where the entire article of footwear is made from the same material, or better still, a uniform composition, unified recycling of the material can be facilitated for further use, thus boosting recycling efficiency and creating environmental benefits.

Other embodiments of the invention are described as follows.

Embodiment 1

A footwear sole, comprising a composition comprising: a propylene-based elastomer comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g.

Embodiment 2

The footwear sole of Embodiment 1, wherein the composition further comprises an ethylene copolymer.

Embodiment 3

The footwear sole of Embodiment 2, wherein the ethylene copolymer is an ethylene-based plastomer comprising about 50 to about 85 wt % ethylene-derived units and up to about 50 wt % of units derived from one or more olefins selected from propylene and $C_4$-$C_{20}$ olefins, based on the total weight of the ethylene-based plastomer.

Embodiment 4

The footwear sole of Embodiment 3, wherein the $C_4$-$C_{20}$ olefin is at least one of 1-butene, 1-hexene, and 1-octene.

Embodiment 5

The footwear sole of any of Embodiments 2-4, wherein the ethylene copolymer is present in an amount of less than about 50 phr relative to the total of the propylene-based elastomer and the ethylene copolymer.

Embodiment 6

The footwear sole of any of Embodiments 1-5, wherein the composition further comprises at least one of a filler and a foaming agent.

Embodiment 7

The footwear sole of any of Embodiments 1-6, wherein the composition further comprises a curing agent and a coagent.

Embodiment 8

The footwear sole of any of Embodiments 1-7, wherein the is footwear sole has at least one of the following properties: (a) a density (SATRA TM134) of less than about 0.40 g/cm$^3$; and (b) a compression set (SATRA TM64, 50° C.) of less than about 25%.

Embodiment 9

A footwear comprising a footwear upper and the footwear sole of any of Embodiments 1-8.

Embodiment 10

The footwear of Embodiment 9, wherein the footwear upper comprises a composition comprising a propylene-based elastomer containing at least about 50 wt % propylene-derived units and about 5 to about 35 wt % ethylene-derived units, based on total weight of the propylene-based elastomer, wherein the propylene-based elastomer has a heat of fusion of less than about 80 J/g.

Embodiment 11

The footwear of Embodiment 10, wherein the composition further comprises an ethylene copolymer.

Embodiment 12

The footwear of Embodiment 9 or 10, wherein the composition and the second composition are different.

Embodiment 13

The footwear of claim 9 or 10, wherein the sole composition and the second composition are the same.

Embodiment 14

The footwear of any of Embodiments 9-13, wherein the footwear upper and the footwear sole are attached by welding.

Embodiment 15

The footwear of any of Embodiments 9-14, wherein the footwear upper and the footwear sole are attached without use of an adhesive.

Embodiment 16

A method for manufacturing a footwear sole, comprising the step of: preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g.

Embodiment 17

The method of Embodiment 14, wherein the footwear sole has at least one of the following properties: (a) a density (SATRA TM134) of less than about 0.40 g/cm$^3$; and (b) a compression set (SATRA TM64, 50° C.) of less than about 25%.

Embodiment 18

A method for manufacturing footwear, comprising the steps of:
(a) preparing a footwear sole comprising a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g; and
(b) forming a footwear comprising the footwear sole in step (a).

Embodiment 19

The method of Embodiment 18, further comprising the steps of: preparing a footwear upper; and attaching the footwear upper to the footwear sole.

Embodiment 20

The method of Embodiment 19, wherein the footwear upper comprises a composition comprising a propylene-based elastomer comprising at least about 50 wt % propylene-derived units and about 5 to about 35 wt % ethylene-derived units, based on total weight of the propylene-based elastomer, wherein the propylene-based elastomer has a heat of fusion of less than about 80 J/g.

Embodiment 21

The method of Embodiment 19 or 20, wherein the footwear upper is attached to the footwear sole by welding.

Embodiment 22

The method of any of Embodiments 19-21, wherein the footwear upper is attached to the footwear sole without use of an adhesive.

Embodiment 23

The method of any of Embodiments 18-22, wherein the footwear sole has at least one of the following properties: (a) a density (SATRA TM134) of less than about 0.40 g/cm$^3$; and (b) a compression set (SATRA TM64, 50° C.) of less than about 25%.

Embodiment 24

A footwear sole, comprising a composition comprising:
(a) a propylene-based elastomer comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g;
(b) an ethylene-based plastomer in an amount of about 30 phr relative to the total of the propylene-based elastomer and the ethylene-based plastomer, comprising about 50 to about 85 wt % ethylene-derived units and up to about 50 wt % of units derived from one or more olefins selected from 1-butene, 1-hexene, and 1-octene, based on the total weight of the ethylene-based plastomer;
(c) a curing agent;
(d) a coagent; and
(e) a foaming agent.

Embodiment 25

The footwear sole of Embodiment 24, wherein the foaming agent comprises at least one of azodicarbonamide;

azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; ammonium bicarbonate; and sodium bicarbonate.

Embodiment 26

The footwear sole of Embodiment 24, wherein the foaming agent comprises azodicarbonamide.

Embodiment 27

The footwear sole of any one of Embodiments 24-26, wherein the composition comprises 1 to 10 phr of the foaming, relative to the total amount of the polymer to be foamed.

Embodiment 28

The footwear sole of any one of Embodiments 24-27, wherein the curing agent comprises at least one of 1,1-bis (t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy) butane; 2,5-dimethylhexane-2,5-dihydroxyperoxide; di-t-butyl peroxide; t-butylcumyl peroxide; dicumyl peroxide; alpha,alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, and alpha,alpha'-bis(t-butylperoxy-m-isopropyl)benzene.

Embodiment 29

The footwear sole of any one of Embodiments 24-27, wherein the curing agent comprises dicumyl peroxide.

Embodiment 30

The footwear sole of any one of Embodiments 24-29, wherein the composition comprises 0.05-5 phr of the curing agent, relative to the amount of the polymer to be cured.

Embodiment 31

The footwear sole of any one of Embodiments 24-30, wherein the coagent comprises at least one of trimethylolpropane trimethacrylate, triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri (diallylamine)-s-triazine, triallyl phosphite, bis-olefins, and N,N-diallylacrylamide.

Embodiment 32

The footwear sole of any one of Embodiments 24-30, wherein the coagent comprises trimethylolpropane trimethacrylate.

Embodiment 33

The footwear sole of any one of Embodiments 24-32, wherein the composition comprises 0.1 to about 10 phr of the coagent, relative to the amount of the polymer to be cured.

EXAMPLES

The present invention, while not meant to be limited by, may be better understood by reference to the following examples and tables.

Example 1

Example 1 illustrates the effects of a composition comprising the propylene-based elastomer described herein (Samples 1-4) on targeted properties in comparison with a composition comprising EVA instead of the propylene-based elastomer but otherwise almost identical in terms of its constituents. For comparative purposes, two comparative examples ("Control") are provided to illustrate the corresponding properties of a composition without the propylene-based elastomer.

Formulations with components and corresponding amounts used to prepare two comparative examples (no propylene-based elastomer) and Samples 1-4 are listed below in Table 2. ESCORENE™ Ultra FL 00218 and ESCORENE™ Ultra FL 00328 EVA resins (ExxonMobil Chemical Company, Houston, Tex., USA) are used in Controls 1-2, and Sample 3, respectively. VISTAMAXX™ 3980FL propylene-based elastomer (ethylene content: 8.5 wt %, MFR: 8.3 g/10 min (230° C./2.16 kg)) (ExxonMobil Chemical Company, Houston, Tex., USA) is used in Samples 1-4. EXACT™ 0201 and EXACT™ 0210 ethylene-based plastomers (ExxonMobil Chemical Company, Houston, Tex., USA) are used in Controls 1-2, Samples 1-2, and Sample 4, respectively. Density (ASTM D1505) and compression set (ASTM D395 Method B, 25% deflection, room temperature, 22 hrs) of the compositions were measured and illustrated in Table 3.

TABLE 2

| Formulations (phr) for Controls 1-2, and Samples 1-4 | | | | | | |
|---|---|---|---|---|---|---|
| Composition No. | 1 | 2 | 3 | 4 | Control 1 | Control 2 |
| EXACT™ 0201 | 30 | 30 | — | — | 70 | 30 |
| EXACT™ 0210 | — | — | — | 30 | — | — |
| ESCORENE™ Ultra FL 00328 | — | — | 30 | — | — | — |
| ESCORENE™ Ultra FL 00218 | — | — | — | — | 30 | 70 |

TABLE 2-continued

Formulations (phr) for Controls 1-2, and Samples 1-4

| Composition No. | 1 | 2 | 3 | 4 | Control 1 | Control 2 |
|---|---|---|---|---|---|---|
| VISTAMAXX ™ 3980 | 70 | 70 | 70 | 70 | — | — |
| CaCO$_3$ | 7.5 | 7.5 | 7.5 | 7.5 | 7.5 | 7.5 |
| ZnO | 1 | 1 | 1 | 1 | 1 | 1 |
| Zinc Stearate | 0.8 | 0.8 | 0.8 | 0.8 | 0.8 | 0.8 |
| Stearic Acid | 0.5 | 0.5 | 0.5 | 0.5 | 0.5 | 0.5 |
| Dicumyl Peroxide | 0.75 | 0.75 | 0.75 | 0.75 | 0.75 | 0.75 |
| TMPTMA | 0.32 | 0.32 | 0.32 | 0.32 | 0.32 | 0.32 |
| Black Masterbatch (PE Base) | 4 | 4 | 4 | 4 | 4 | 4 |
| ADC/p-Toluene Sulfonyl Hydrazide | 3.5 | — | — | 3.5 | 3.5 | 3.5 |
| Highly Activated ADC Masterbatch | — | 5.8 | 5.8 | — | — | — |
| Total | 118.37 | 120.67 | 120.67 | 118.37 | 118.37 | 118.37 |

TABLE 3

Density and Compression Set of Controls 1-2, and Samples 1-4

| Composition No. | 1 | 2 | 3 | 4 | Control 1 | Control 2 |
|---|---|---|---|---|---|---|
| Density (g/cm$^3$) | 0.41 | 0.36 | 0.34 | 0.44 | 0.45 | 0.5 |
| Compression Set (%) | 15 | 11 | 9 | 15 | 25 | 33 |

It can be seen from the above data that use of the propylene-based elastomer can deliver footwear manufacturing compositions with a significantly reduced compression set as compared with the traditional compositions comprising EVA while maintaining a density comparable to or even lower than that of the traditional counterparts.

Example 2

In Example 2, Sample 2 of Example 1 was molded onto an A4-sized plaque as a footwear sole sample for further tests on typical properties according to SATRA test specifications (available from "SATRA Test Methods Catalogue", May 2012, SATRA Technology Center) for footwear. Test results are shown below in Table 4.

As shown in Table 4, the A4-sized plaques based on Sample 2 almost passed all tests for footwear soles, except the wet slip resistance. The wet slip resistance value was on the borderline of passing, and could easily be improved through changes in sole design and/or composition modification. It is noted that a good balance was achieved between all the tested properties including density, compression set, abrasion resistance, tear strength, etc., without compromising any of them, thus, making the resulting footwear soles qualified and suitable for footwear applications.

TABLE 4

Properties of Molded Plaques Based on Sample 2

| SATRA Test | Property | Unit | Guideline | Sample 2 Value | Result |
|---|---|---|---|---|---|
| TM 134 | Density | g/cm$^3$ | Info Only | 0.384 | N/A |
| TM 144 | Slip Resistance - Dry | Coeff. of Friction | Min 0.50 | 0.514 | Pass |
| TM 144 | Slip Resistance - Wet | Coeff. of Friction | Min 0.50 | 0.459 | Marginal Fail |
| TM 160 | Colorfastness to Light | Greyscale | Min 4 | 5 | Pass |
| TM 174 | DIN Abrasion Resistance | mm$^3$ | Max 250 | 153.81 | Pass |
| TM 64 | Compression Set | % | Max 25 (Casual) | 12.72 | Pass |
| TM 70 | Heat Shrinkage | % | Max 2 | Lengthwise = 0.53 Crosswise = 0.24 | Pass |
| TM 65 | Split Tear Strength | N/mm | Min 2.0 | Along = 3.1 Across = 4.1 | Pass |
| TM 5 | Stitch Tear Strength | N/mm | Min 25 | Along = 29 Across = 34 | Pass |
| ASTM D624 | Die C Tear Strength | N/mm | Min 12 | Along = 17 Across = 16 | Pass |
| TM 60 | Ross Flex Test - Resistance to Cut Growth on Flexing | mm/kc | Max 0.04 | Along = Nil Across = Nil | Pass |

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A footwear sole, comprising a composition comprising:
a propylene-based elastomer in an amount of about 65 phr to about 85 phr comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g;
wherein the footwear sole has a compression set, measured at 50° C. by SATRA TM64, of less than about 25%, and
wherein the footwear sole has a density (SATRA TM134) of less than about 0.40 g/cm$^3$, and
wherein the footwear sole is melt processable.

2. The footwear sole of claim 1, wherein the composition further comprises an ethylene copolymer.

3. The footwear sole of claim 2, wherein the ethylene copolymer is an ethylene-based plastomer comprising about 50 to about 85 wt % ethylene-derived units and up to about 50 wt % of units derived from one or more olefins selected from propylene and $C_4$-$C_{20}$ olefins, based on the total weight of the ethylene-based plastomer.

4. The footwear sole of claim 3, wherein the $C_4$-$C_{20}$ olefin is at least one of 1-butene, 1-hexene, and 1-octene.

5. The footwear sole of claim 2, wherein the ethylene copolymer is present in an amount of less than about 50 phr relative to the total of the propylene-based elastomer and the ethylene copolymer.

6. The footwear sole of claim 1, wherein the composition further comprises at least one of a filler and a foaming agent.

7. The footwear sole of claim 1, wherein the composition further comprises a curing agent and a coagent.

8. The footwear sole of claim 1, wherein the footwear sole has a density (SATRA TM134) of less than about 0.30 g/cm$^3$.

9. A footwear comprising a footwear upper and the footwear sole of claim 1.

10. The footwear of claim 9, wherein the footwear upper comprises a second composition comprising a propylene-based elastomer containing at least about 50 wt % propylene-derived units and about 5 to about 35 wt % ethylene-derived units, based on total weight of the propylene-based elastomer, wherein the propylene-based elastomer has a heat of fusion of less than about 80 J/g.

11. The footwear of claim 10, wherein the second composition further comprises an ethylene copolymer.

12. The footwear of claim 10, wherein the composition and the second composition are different.

13. The footwear of claim 10, wherein the composition and the second composition are the same.

14. The footwear of claim 9, wherein the footwear upper and the footwear sole are attached by welding.

15. The footwear of claim 9, wherein the footwear upper and the footwear sole are attached without use of an adhesive.

16. A footwear sole, comprising a composition comprising:
(a) a propylene-based elastomer in an amount of about 70 phr relative to the total of the propylene-based elastomer and the ethylene-based plastomer, comprising at least about 50 wt % propylene-derived units and about 5 to about 35 wt % ethylene-derived units, based on the total weight of the propylene-based elastomer, wherein the propylene-based elastomer has a heat of fusion of less than about 80 J/g;
(b) an ethylene-based plastomer in an amount of about 30 phr relative to the total of the propylene-based elastomer and the ethylene-based plastomer, comprising about 50 to about 85 wt % ethylene-derived units and up to about 50 wt % of units derived from one or more olefins selected from 1-butene, 1-hexene, and 1-octene, based on the total weight of the ethylene-based plastomer;
(c) a curing agent in an amount of 0.05 phr to 5 phr relative to the total of the propylene-based elastomer and the ethylene-based plastomer;
(d) a coagent in an amount of 0.1 phr to 10 phr relative to the total of the propylene-based elastomer and the ethylene-based plastomer; and
(e) a foaming agent in an amount of 1 phr to 10 phr relative to the total of the propylene-based elastomer and the ethylene-based plastomer,
wherein the footwear sole has a compression set, measured at 50° C. by SATRA TM64, of less than about 25%,
wherein the footwear sole has a density (SATRA TM134) of less than about 0.40 g/cm$^3$, and
wherein the footwear sole is melt processable.

* * * * *